April 13, 1965        T. J. SHARP        3,177,900

FLEXIBLE ARTICLE WITH FLAME-RESISTANT COVER

Filed April 9, 1962

United States Patent Office 3,177,900
Patented Apr. 13, 1965

3,177,900
FLEXIBLE ARTICLE WITH FLAME-RESISTANT COVER
Thomas John Sharp, Preston, England, assignor to BTR Industries Limited, London, England, a British company
Filed Apr. 9, 1962, Ser. No. 186,262
Claims priority, application Great Britain, Apr. 17, 1961, 13,762/61
12 Claims. (Cl. 138—125)

This invention relates to flexible articles provided with flame-resistant or flame-retarding covers and, more particularly, to flexible hose or belts having a flexible covering layer formed of a composition that is resistant to heat or flame.

Flexible hose and conveyor or other belts of conventional construction, containing the usual elastomeric materials and reinforcing elements such as wire or textile cords, deteriorate or fail when subjected to heat and/or flame.

The principal object of this invention is to materially reduce this defect in flexible articles, such as hose or belts, by providing an improved construction including an impervious cover therefor which has increased resistance to heat and flame.

A more specific object of the invention is to improve the heat and flame resistance of flexible articles, such as hose or belts, by providing them with an outer cover formed of a composition comprising a vinyl resin and a thermosetting elastomeric compound disposed over a layer of fiber glass positioned between the cover layer and the integral body of the article.

A still more specific object of the invention is to improve the flame resistance of flexible articles, such as hose or belts, by providing them with a covering layer formed of a composition comprising a vinyl resin, a thermosetting elastomeric compound and a flame-retarding plasticizer.

The invention also comprehends within its scope an improved hose or belt construction wherein the outer surface has a covering provided by a composition comprising a vinyl resin, a thermosetting elastomeric compound and a flame-retarding plasticizer, there also being a layer of fiberglass provided between the said cover layer and the internal body of the belt or hose.

Further objects of the invention include: improvement of the processability of a cover layer for flexible articles, as defined in the preceding objects, by the inclusion therein of nitrile rubber and/or sodium laurate; and improvement in the physical properties of such a cover layer by the inclusion therein of fillers and vulcanizing or stabilizing materials.

Figure 1:
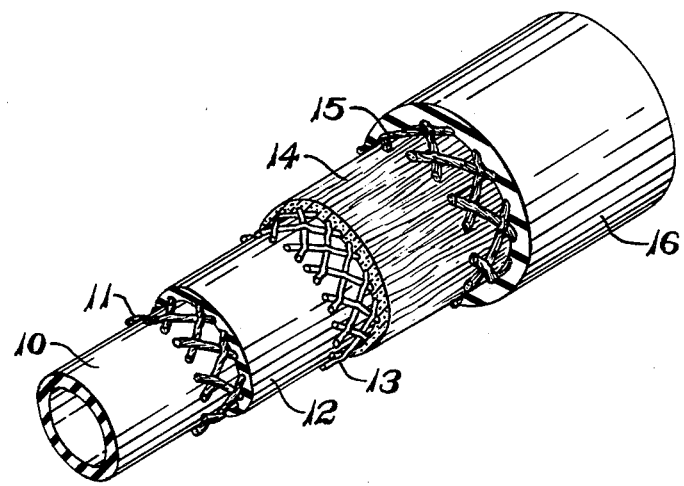
Figure 2:
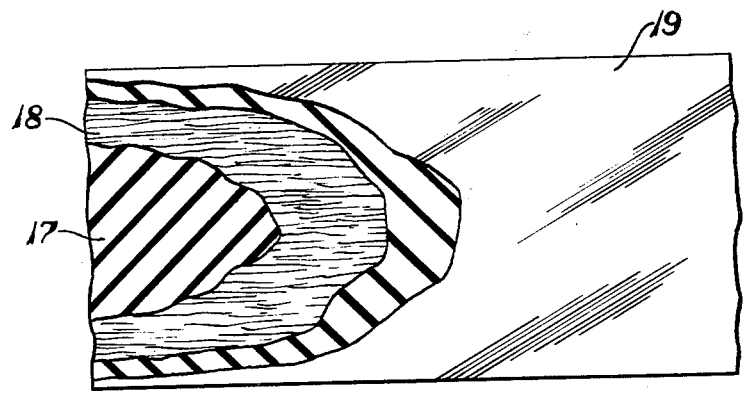

Other and further objects and advantages of the invention will be hereinafter apparent from the following detailed description of the invention described with reference to the accompanying drawing, forming a part of this application, and in which:

FIG. 1 is a fragmentary perspective view, with parts in section as the result of being broken away in stepped relationship, illustrating a presently preferred hose construction embodying the invention; and FIG. 2 illustrates the invention as it is incorporated in a conveyor belt, the view being principally in top elevation but with parts broken away and in section to more clearly illustrate the construction.

FIG. 1 illustrates a hose of the type made in accordance with this invention which may be employed in an aircraft fuel or oil system and, hence, must be capable of withstanding heat and/or resist flame without deterioration sufficient to permit leakage of the hydrocarbon which is conveys. Such a hose comprises an inner tube 10 of oil-resistant polymer, such as a nitrile rubber or polychloroprene (neoprene), over which are placed, in succession, a plurality of layers of reinforcements and a cover. As here shown, the tube 10 has immediately thereover a layer 11 of light textile braid or scrim of cotton or rayon which, in turn, is covered by a layer 12 of nitrile or neoprene rubber. Over the layer 12 is a reinforcing braid 13 or spiral of wire, and about this is a mat or bat 14 of glass fibers which is covered by a light textile braid 15 to assist in holding the fibers in place. Finally, the exterior of the hose is provided with a cover layer 16 which is formed of a composition comprising a vinyl resin and a thermosetting elastomeric compound with these being mixed together in proportions to provide a flame-resistant thermosetting material.

The vinyl resin of the cover 16 is preferably a polyvinyl chloride polymer while the thermosetting elastomer is polychloroprene. The polychloroprene may be sulfur modified or unmodified and the polyvinyl chloride may be modified with another vinylic material, such as vinylidene chloride or vinyl acetate. Preferably, the composition also includes a flame resisting or retarding plasticizer, such as a resinous chlorinated diphenyl, an organic phosphate ester or a chlorinated wax. There may also be used in the composition other ingredients such as are commonly used in compounding natural or synthetic rubbers and thermoplastic polymers. Fillers may also be employed to increase the bulk and/or impart desired properties. In addition, processing of the composition comprising the cover layer 16 may be facilitated by inclusion therein of a quantity of a nitrile rubber or other materials as will hereinafter appear in the specific examples of compositions that have been utilized. Preparation of the composition may be facilitated by pre-fusing the polyvinyl chloride and then adding this to the polychloroprene.

The invention may also be employed in the formation of belts, such as conveyor belts, as is shown in FIG. 2. Such a belt may employ a body portion 17 of usual construction including elastomer and reinforcing cords. This is protected, in accordance with this invention, by placing over at least the surface which may be subjected to heat and/or flame a layer of glass fibers 18 covered with a layer 19 the composition of which is the same as that employed for the cover layer 16 of the hose.

The protective cover layers 16 and 19 may be formed upon the hose or belt by extrusion thereover, by molding, or by forming the cover material into sheets or strips and wrapping these about the article. The hose or belt provided with the improved covering material may be cured in known manner and with known equipment. In view of the thermosetting nature of the cover composition, it retains its form when subjected to heat and hence manufacture, especially of belts, is facilitated since they may be removed from a mold without the necessity of cooling before removal.

Some specific examples of compositions which may be used for the covers such as 16 and 19 in practicing the invention are as follows:

Composition I

| Material: | Parts by weight |
|---|---|
| Polychloroprene | 100.00 |
| Polyvinyl chloride | 50.00 |
| Barium-cadmium soap | 1.10 |
| Zinc oxide | 5.00 |
| Light magnesium oxide | 2.25 |
| Sulphur | 1.00 |
| Diorthotolyl guanidine | 0.50 |
| Tetramethyl thiuram monosulphide | 0.50 |
| Whiting | 100.00 |
| Trixylenyl phosphate | 20.00 |

Composition II

| Material: | Parts by weight |
|---|---|
| Polychloroprene | 100.00 |
| Polyvinyl chloride | 50.00 |
| Barium-cadmium soap | 1.10 |
| Zinc oxide | 5.00 |
| Light magnesium oxide | 2.25 |
| Sulphur | 1.00 |
| Diorthotolyl guanidine | 0.50 |
| Tetramethyl thiuram monosulphide | 0.50 |
| Whiting | 100.00 |
| Chlorinated diphenyl | 20.00 |

Composition III

| Material: | Parts by weight |
|---|---|
| Polychloroprene | 75.00 |
| Polyvinyl chloride | 75.00 |
| Barium-cadmium soap | 1.10 |
| Zinc oxide | 5.00 |
| Light magnesium oxide | 2.25 |
| Sulphur | 1.00 |
| Diorthotolyl guanidine | 0.50 |
| Tetramethyl thiuram monosulphide | 0.50 |
| Whiting | 100.00 |
| Trixylenyl phosphate | 20.00 |

Composition IV

| Material: | Parts by weight |
|---|---|
| Polychloroprene | 75.00 |
| Polyvinyl chloride | 75.00 |
| Barium-cadmium soap | 1.10 |
| Zinc oxide | 5.00 |
| Light magnesium oxide | 2.25 |
| Sulphur | 1.00 |
| Diorthotolyl guanidine | 0.50 |
| Tetramethyl thiuram monosulphide | 0.50 |
| Whiting | 100.00 |
| Chlorinated diphenyl | 20.00 |

Composition V

| Material: | Parts by weight |
|---|---|
| Polychloroprene | 100.0 |
| Polyvinyl chloride | 50.0 |
| Mixture of octylated diphenyl amines | 2.0 |
| Barium-cadmium soap | 1.0 |
| Light magnesium oxide | 2.0 |
| Semi-reinforced furnace carbon black | 25.0 |
| Precipitated silica | 35.0 |
| Diorthotolyl guanidine | 0.5 |
| Tetramethyl thiuram monosulphide | 0.5 |
| Sulphur | 1.0 |
| Diethylene glycol | 1.0 |
| Zinc oxide | 5.0 |
| Trixylenyl phosphate | 15.0–100.0 |
| Chlorinated diphenyl | 20.0–100.0 |

Composition VI

| Material: | Parts by weight |
|---|---|
| Polychloroprene | 90.0 |
| Polyvinyl chloride | 50.0 |
| Barium-cadmium soap | 1.0 |
| Nitrile rubber | 10.0 |
| Phenyl-beta naphthylamine | 2.0 |
| Light calcined magnesia | 4.0 |
| Semi-reinforced furnace carbon black | 25.0 |
| Hydrated silica | 35.0 |
| Diorthotolyl guanidine | 0.5 |
| Tetramethyl thiuram monosulphide | 0.5 |
| Sulphur | 1.0 |
| Zinc oxide | 5.0 |
| Polyethylene | 3.0 |
| Trixylenyl phosphate | 15.0 |
| Chlorinated diphenyl (liquid) | 10.0 |
| Chlorinated diphenyl (solid) | 10.0 |

Composition VII

| Material: | Parts by weight |
|---|---|
| Polychloroprene | 100.0 |
| Polyvinyl chloride | 50.0 |
| Nitrile rubber | 10.0 |
| Barium-cadmium soap | 1.0 |
| Mixture of octylated diphenyl amines | 2.0 |
| Light calcined magnesia | 4.0 |
| Semi-reinforced furnace carbon black | 25.0 |
| Hydrated silica | 35.0 |
| Diorthotolyl guanidine | 0.5 |
| Tetramethyl thiuram monosulphide | 0.5 |
| Sulphur | 1.0 |
| Zinc oxide | 5.0 |
| Polyethylene | 3.0 |
| Chlorinated diphenyl (liquid) | 10.0 |
| Chlorinated diphenyl (solid) | 10.0 |
| Trixylenyl phosphate | 10.0 |
| Sodium laurate:35% lauric acid | 5.0 |

In the above compositions, the polychloroprene is preferably neoprene W. The polyvinyl chloride is preferably that sold by the B. F. Goodrich Chemical Company under the trademark Geon 121. The barium-cadmium soap may be that sold under the registered trademark Ferroclere 1825. The chlorinated diphenyl may be that sold by Monsanto Chemical Company under the registered trademark Aroclor with the liquid form of this material being Aroclor 1254 and the solid form Aroclor 5460. The mixture of octylated diphenyl amines may be that sold by R. T. Vanderbilt Company as stalites under the registered trademark Agerite. The phenyl-beta naphthylamine is that sold by R. T. Vanderbilt Company under the trademark Agerite powder. The nitrile rubber is that sold by the B. F. Goodrich Chemical Company under the registered trademark Hycar 1042. The hydrated silica is that sold by the Columbia Southern Chemical Company under the registered trademark Hi-Sil 233.

The glass fibers employed in the layers, such as 14 and 18, may be any commercially available materials of this nature among which the following are available under the listed trade names:

(1) Tyglass chopped strand mat (sold by Fothergill & Harvey) _____ 1 oz., 1½ oz., or 2 oz./sq. ft.
(2) Deeformat DFM/RF, Type 1 or Type 3 (sold by Deeside Fabrics and Glass Yarns Limited) _____ 1 oz., 1½ oz., or 2 oz./sq. ft.
(3) Fiberglas chopped strand mat (sold by Owens-Corning Fiberglas Corporation) _____ 1 oz., 1½ oz., or 2 oz./sq. ft.

Hose intended for carrying fuel in aircraft in one test of its serviceability is filled with oil under pressure. The hose is then bent through an angle of 180° and one end thereof is vibrated while a flame is directed radially upon the portion of the hose (i.e. the region of bend or at an end fitting) under test. The flame is produced by a Calor gas blowpipe supplied with Calor gas at a pressure of 3½ lbs. per sq. in. and the distance of the end of the blowpipe from the nearest surface of the hose is 2 inches. Under such a test, breakdown is thought to be due to a combination of actions. Thus, the heat produces further cross-linking of the cover polymer which ultimately breaks down and depolymerizes. In addition, oil within the hose, which is heated upon failure of the cover, softens the internal tube allowing the material thereof to be pushed through the wire braid.

The presence of the glass fibers, in a hose constructed in accordance with this invention, serves to insulate the interior tube from the heat but this insulation is effective only so long as the cover is not cracked by the heat. The improved heat and flame resistance provided by the cover layer compositions of this invention not only resides in its better resistance to burning but also in its greater resistance to cracking than is the case of a cover formed entirely of thermosetting material. This improved resistance to cracking is attributed to the retention by the layer of a certain amount of thermoplasticity.

The extent of improvement in heat and flame resistance which is achieved by a cover layer, made in accordance with this invention, will be apparent from the following table which compares the heat resistance under a flame test, conducted substantially as described above, of hose constructed with a cover employing the listed ingredients (plus the unlisted, usual vulcanizing agents and stabilizers) but without the glass fiber layer such as 14 beneath the cover.

|  | A | B | C |
|---|---|---|---|
| Polychloroprene | 100 | 100 | 100. |
| Polyvinyl chloride | 50 | 50 | 50. |
| Whiting | 100 | 100 | 100. |
| Chlorinated diphenyl |  |  | 20. |
| Trixylenyl phosphate |  | 20 |  |
| Flame resistance | 4 min., 54 secs. | 8 min., 50 secs. | 10 min., 22 secs. |

A cover comprising polychloroprene, filler and vulcanizing agents but without polyvinyl chloride or a flame-retarding plasticizer, and subjected to the same test endured for a period of only 3 to 3½ minutes in contrast with the 10 minutes 22 seconds when the polychloroprene was mixed with polyvinyl chloride and chlorinated diphenyl (test C above). When the hose was additionally provided with the layer of glass fibers beneath the improved cover, in a construction similar to that shown in FIG. 1, the hose endured the same test for periods of 25-30 minutes without failure.

Increase of the polyvinyl chloride in the ratio acts to further increase the flame resistance of the compound and the ratio of polyvinyl chloride to the polychloroprene may be varied from 1:2 to 1:1 without serious defects in processing. The tensile strength and elongation of the material, which normally tends to decrease with the addition of polyvinyl chloride, is offset by the use of suitable fillers such as whiting, carbon black, silica and the like. To assist in processing, nitrile rubber may be employed in quantities up to 12 parts by weight to 100 parts of the polychloroprene. Sodium laurate has also been successfully employed, as indicated above, to facilitate milling of the composition and compounding was further facilitated by forming a pre-mix of the resin plasticizers with the polyvinyl chloride and gelling this at about 150° C. before mixing it with the polychloroprene on a mixing mill.

In the manufacture of the hose the layer of glass fibers may be applied in the form of a strip or mat wrapped helically or longitudinally around the internal construction. A guide in the form of a generally funnel configuration may be used to facilitate the application of the glass strip or mat. Preferably, the glass fibers are not impregnated. Should several layers of wire braid be desired for additional strength, the glass fibers may be applied between the two braids but preferably it is placed, as in the case of the single braid, on the outside of the wire braiding. It will be understood also that in place of wire the reinforcing braiding may be formed of natural or synthetic fibers. Further, spiral wrapping may be employed instead of braiding. It will also be evident that the glass fibers may be in woven or braided form and may be replaced with a layer of aluminized or plain asbestos cloth or mat or by bats or fabric of silica. These and other modifications of the invention will be readily apparent to those skilled in the art and are considered as being within the ambit of the invention, the scope of which is defined in the appended claims.

Having thus described the invention, I claim:

1. A laminated flexible article comprising a body of elastomer and flexible reinforcing elements, a layer of glass fibers outwardly of said reinforcing elements, and an external covering layer formed of a composition comprising a vinyl resin, a thermosetting elastomeric compound and a flame retarding plasticizer.

2. An article as defined in claim 1 in which the flame retarding plasticizer is a material selected from the group consisting of resinous chlorinated diphenyls, organic phosphate esters and chlorinated waxes.

3. An article as defined in claim 1 in which the covering layer composition also contains a nitrile rubber.

4. An article as defined in claim 1 in which the covering layer composition also contains a nitrile rubber present in amounts up to 12 parts by weight per 100 parts of elastomer.

5. An article as defined in claim 1 in which the covering layer composition also contains a nitrile rubber and up to 5 parts by weight of sodium laurate per 100 parts of elastomer.

6. An article as defined in claim 1 in which the covering layer composition also includes a filler.

7. An article as defined in claim 1 in which the vinyl polymer is a prefluxed polyvinyl chloride compound and the thermosetting elastomeric compound is polychloroprene.

8. A hose including an inner impervious flexible tube, flexible reinforcing elements surrounding said tube, a layer of glass fibers radially outwardly of said reinforcing elements, and a flexible outer covering layer comprising a mixture of a vinyl polymer, an elastomeric composition which is thermosetting and a flame retarding plasticizer.

9. A hose as defined in claim 8 in which the covering layer also contains a nitrile rubber.

10. A hose comprising an inner impervious tube of oil-resistant elastomer, one or more layers of flexible reinforcing elements including at least one layer of braided wire surrounding said tube, a layer of glass fibers radially outwardly of said layer of braided wire and an outer flame retarding covering composition comprising polychloroprene, polyvinyl chloride and a flame retarding plasticizer in which the ratio of the parts by weight of the polychloroprene to the polyvinyl chloride is in the order of 2:1.

11. A hose as defined in claim 10 in which the flame retarding plasticizer is selected from the group consisting of resinous chlorinated diphenyls and organic phosphate esters.

12. A belt comprising a body portion provided with a flexible flame retarding cover on at least its outermost surface the composition of which cover includes polychloroprene, polyvinyl chloride and a flame retarding plasticizer with the ratio of the parts by weight of the polychloroprene to the polyvinyl chloride being in the order of 2:1, and a layer of glass fibers between the said flame retarding cover and the body portion.

References Cited by the Examiner

UNITED STATES PATENTS

| 2,436,421 | 2/48 | Cork | 138—125 |
| 2,547,605 | 4/51 | Signer et al. | 260—45.5 |
| 2,578,188 | 12/51 | Ionides et al. | 161—247 X |
| 2,581,920 | 1/52 | Kuhn | 156—331 |
| 2,658,051 | 11/53 | Signer | 161—251 X |
| 2,690,769 | 10/54 | Brown | 138—125 |
| 2,711,778 | 6/55 | Waugh | 154—52.2 |
| 2,757,709 | 8/56 | Crabbe et al. | 161—247 X |
| 2,783,818 | 3/57 | Kenny | 154—52.2 |
| 2,787,289 | 4/57 | Press | 138—125 X |
| 3,005,796 | 10/61 | Dreisbach et al. | 260—45.5 |
| 3,018,800 | 1/62 | Hanssens | 138—125 |
| 3,024,813 | 3/62 | Sear et al. | 161—253 X |
| 3,026,223 | 3/62 | Vanderbilt et al. | 161—331 X |

(Other references on following page)

FOREIGN PATENTS 810,029 3/59 Great Britain.
836,203 6/60 Great Britain.
613,635 1/61 Canada.

OTHER REFERENCES

A Guide to Synthetic Rubbers, Malcom W. Riley, Materials in Design Engineering, September 1957, pages 135–137, and 140 (copy in Patent Office Library).

Synthetic Rubber, G. S. Whitby, pages 569 and 815, John Wiley and Sons, New York, copyright Sept. 15, 1954 (copy in Patent Office Technical Library).

LEWIS J. LENNY, *Primary Examiner.*
EDWARD V. BENHAM, *Examiner.*